(12) United States Patent
Maze et al.

(10) Patent No.: US 8,077,601 B2
(45) Date of Patent: Dec. 13, 2011

(54) METHOD, DEVICE AND SOFTWARE APPLICATION FOR SCHEDULING THE TRANSMISSION OF DATA STREAM PACKETS

(75) Inventors: Frédéric Maze, Langan (FR); Eric Nassor, Thorigne-Fouillard (FR)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 12/514,307

(22) PCT Filed: Nov. 14, 2007

(86) PCT No.: PCT/EP2007/062344
§ 371 (c)(1),
(2), (4) Date: Jul. 22, 2009

(87) PCT Pub. No.: WO2008/059000
PCT Pub. Date: May 22, 2008

(65) Prior Publication Data
US 2010/0040077 A1    Feb. 18, 2010

(30) Foreign Application Priority Data
Nov. 14, 2006   (FR) ..................................... 06 09920

(51) Int. Cl.
*H04L 12/26* (2006.01)
*H04L 12/28* (2006.01)
(52) U.S. Cl. ........................................ 370/216; 370/255
(58) Field of Classification Search ........................ None
See application file for complete search history.

(56) References Cited

U.S. PATENT DOCUMENTS

| 6,687,257 | B1 | 2/2004 | Balasubramanian |
| 7,450,601 | B2 * | 11/2008 | Sundqvist et al. ............. 370/412 |
| 7,792,014 | B2 * | 9/2010 | Tsang ........................... 370/216 |
| 2004/0062260 | A1 * | 4/2004 | Raetz et al. ................... 370/412 |
| 2004/0066673 | A1 * | 4/2004 | Perego et al. ................. 365/200 |
| 2005/0021806 | A1 | 1/2005 | Richardson |

(Continued)

FOREIGN PATENT DOCUMENTS
WO    2005/076539    8/2005

OTHER PUBLICATIONS

PCT International Search Report and Written Opinion of the International Searching Authority in International Application No. PCT/EP2007/062344, mailed Jan. 21, 2008.

(Continued)

*Primary Examiner* — Hong Cho
(74) *Attorney, Agent, or Firm* — Fitzpatrick, Cella, Harper & Scinto

(57) ABSTRACT

The invention relates to a method for transmitting over a data communication network data packets of a data stream to a receiving device, characterized in that it comprises the steps of: selecting a data packet from a buffer memory containing data packets to be transmitted (301, 401); determining whether the playout time of the selected data packet at the receiving device allows a recovery of said selected data packet (303, 410); assigning a first priority level or a second priority level to the selected data packet based on the result of the determining step (306, 307, 411, 413); and transmitting the selected data packet with said assigned first or second priority level (308, 408). The invention relates also to a software application and a transmitting device implementing the transmission method.

17 Claims, 5 Drawing Sheets

U.S. PATENT DOCUMENTS

2005/0114386 A1 5/2005 Nassor
2005/0198118 A1 9/2005 Viger
2005/0232154 A1 10/2005 Bang
2008/0084821 A1 4/2008 Maze
2008/0123560 A1 5/2008 Nassor
2008/0294789 A1 11/2008 Nassor
2009/0210765 A1 8/2009 Henocq

OTHER PUBLICATIONS

U.S. Appl. No. 12/555,687, filed on Sep. 8, 2009.
"DLNA Networked Device Interoperability Guidelines", Digital Living Network Alliance, pp. 1-618, Mar. 2006.

* cited by examiner

METHOD, DEVICE AND SOFTWARE APPLICATION FOR SCHEDULING THE TRANSMISSION OF DATA STREAM PACKETS

BACKGROUND OF THE INVENTION

1. Technical Field of the Invention

The present invention relates to data communication networks. The present invention is especially applicable for the delivery of data packets of a data stream from a transmitting device to a receiving device.

2. Description of the Background Art

Data communication networks have shown to be unreliable because of transmission errors, congestions or temporary link outage, which cause loss of data packets. Many data networks like IP (Internet Protocol) networks or ATM (Asynchronous Transfer Mode) comprise interconnection nodes (routers, switches, etc.) to route data packets from source devices to destination devices. In this type of network, congestion is the main source of losses because reception buffers at the interconnection nodes are not sized to absorb severe traffic loads or because different data streams served by a given interconnection node have to pass through a same link with insufficient capacity. Surplus data packets are finally discarded by the interconnection nodes. Moreover, IP networks implementing congestion control mechanisms of type TFRC (TCP Friendly Rate Control, IETF RFC3448) or AIMD (Additive Increase/Multiplicative Decrease, IETF RFC2581) produce by nature a plurality of congestions even if they are of short duration.

When a congestion occurs, interconnection nodes drop more or less data packets to keep the filling level of the reception buffers under an acceptable threshold.

It is known from the prior art that the discarding of data without consideration as to the importance of the data can have serious negative consequences for certain types of data transmissions such as video streams.

In US2005/0021806, Richardson et al. teach to associate priority levels to data streams wherein a higher priority level being assigned to data type of high importance and a lower priority level being assigned to data type of low importance, the importance depending on the content of the data. Consequently, when congestion in the network causes data to be dropped, data of the stream of a data type that is of less importance is dropped before data of the stream of a data type that is of a greater importance.

However, even if data of high importance is not likely to be dropped during congestion by its association to a high priority level, rendering of the data stream at the destination device after a congestion is still degraded because of the absence of low importance data.

There is a need to reduce the effect of dropped data packets on the quality of the rendered data stream at the destination device.

SUMMARY OF THE INVENTION

The present invention has been made for reducing the effect of data packet losses by appropriately assigning priority levels to data packets prior their transmission.

According to a main aspect of the present invention, there is provided a method for transmitting over a data communication network data packets of a data stream to a receiving device comprising the steps of:

selecting a data packet from a buffer memory containing data packets to be transmitted;

determining whether the playout time of the selected data packet at the receiving device allows a recovery of said selected data packet;

assigning a first priority level or a second priority level to the selected data packet based on the result of the determining step; and transmitting the selected data packet with said assigned first or second priority level.

An advantage of this method is to enhance the strategy of assigning priority levels to data packets by taking into account the possibility of recovering those data packets. The recovery may be performed by retransmitting data packets that are dropped due to a network congestion. Alternatively, the recovery may be performed by transmitting redundancy packets generated from at least the dropped data packets by means of a Forward Error Correction (FEC) scheme. Better rendering quality of the data stream, e.g. video display quality, is thus provided.

Furthermore, this method is well efficient when network congestions are of short durations as those generated by congestion control mechanisms of type TFRC or AIMD.

Advantageously, the higher of the first and second priority levels is assigned to the selected data packet if the playout time of the selected data packet does not allow a recovery of said selected data packet. Thus, the likelihood for the selected data packet to not be dropped if a congestion occurs is higher. If the playout time of the selected data packet allows a recovery, it is enough to assign the lower of the first and second priority levels to the selected data packet since there is still at least another chance to recover that data packet, for example by retransmitting it with potentially a different assigned priority level.

According to a preferred embodiment of the invention, the data stream contains data types of different importance, and wherein the priority level assigned is based on the type of data contained in the selected data packet in addition to the result of determining step.

The advantage is thus to construct an aggregated data importance measure that takes into account not only the importance level of the data but also whether the corresponding data packet has a chance to be recovered or not, for example by means of a retransmission if an initial transmission fails.

Advantageously, when the content of said data packet contains high important data, the higher of the first and the second priority levels is assigned if the result of the determining step is negative, i.e. the playout time of the selected data packet at the receiving device does not allow a recovery of said selected data packet, and the lower of the first and the second priority levels is assigned if the result is positive, i.e. the playout time does allow a recovery of the selected data packet. The likelihood of correctly delivering at the receiving device both high and low important data is thus increased.

The invention also relates to a software application for transmitting over a data communication network data packets of a data stream to a receiving device.

Furthermore, the invention relates to a transmitting device implementing the software application for transmitting the data packets, and to a memory medium for storing the code of such software application.

DETAILED DESCRIPTION OF THE EMBODIMENTS

In the following, a detailed description will be given of embodiments of the present invention with reference to the accompanying drawings.

Figure 1:
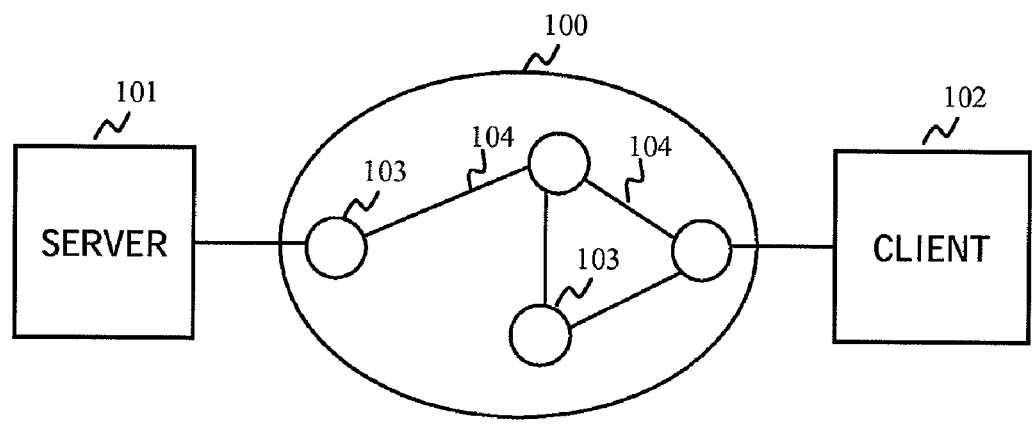
FIG. 1 is an example of a data communication network where the present invention can be implemented.

FIG. 1 is an example of a data communication network where the present invention can be implemented. A transmitting device or server (101) transmits data packets of a data stream to a receiving device or client (102) across a data communication network (100). The data communication network may contain interconnection nodes (103) and links (104) that create paths between devices. Interconnection nodes and receiving device may drop data packets when congestion occurs (overflow of the reception memory).

Typically, the data communication network implements a mechanism for managing network traffic and providing quality of service (QoS) guarantees such as DiffServ (Differentiated Services) that exists in modern Internet Protocol (IP) networks. DiffServ operates on the principle of traffic classification, where each data packet is placed into a limited number of traffic classes (7 for example). Each interconnecting node (router) on the network is configured to differentiate traffic based on its class. Each traffic class can be managed differently, insuring preferential treatment for higher priority traffic on the network when data packets have to be dropped.

By sending data packets using different priorities, the server 101 can control which type of packets are dropped by network routers 103 in presence of congestion and by extension the impact of packet losses on final data stream quality.

The data stream provided by the server 101 may comprise video information, audio information, combinations of both or any other kind of information that may embed different levels of data importance.

An example of such a data stream is an MPEG video stream comprising different types of video frames such as key frames (I), forward predictive frames (P), and backward predictive frames (B), where the key frames serve as the basis for processing the forward and backward predictive frames. I frames thus represent important data since the loss of one I frame makes it impossible to correctly process the associated P and B frames. Inversely, P and B frames represent less important data since their loss does not preclude the decoder at the receiving device from processing the I frames, and results in a degraded quality only.

Other compression techniques known to skilled persons in the art (H.264/AVC, MPEG4 for video, AMR, G.711, AAC for audio, etc.) lead similarly to data streams embedding different levels of data importance. For example, a H.264/AVC video stream contains headers that describe the content of data blocks, motion vectors and texture information. Headers may be considered as high important data, motion vectors as data of medium importance and texture information as low important data.

Relative importance of data may also be inferred from the type of the data stream independently of any compression technique. For example, in an audio/video stream, audio data may be considered more important than video data.

The data packets may be any collection of portions of the data stream sharing the same or close level of data importance. Different techniques can be used for partitioning the data stream into data packets. For example, an MPEG video stream can be transported into two types of data packets; high importance data packets containing I frames data and low importance data packets containing P and/or B frames data. Moreover, one frame may be transported in several data packets of a given type. Alternatively, the coding of a video stream may be performed on a slice basis, wherein a slice forms an independently coded portion of a video frame. Similarly to the video frame coding, the coding of video slices may lead to different levels of data importance that can be transported in one or more data packets.

The transmitting device 101 may be any kind of data processing device with the capability of providing a data stream to a receiving device. In one example, the transmitting device is a stream-server capable of providing content to clients upon request, for example by using RTP (Real-time Transport Protocol) or any other kind of communication protocol.

Figure 2:
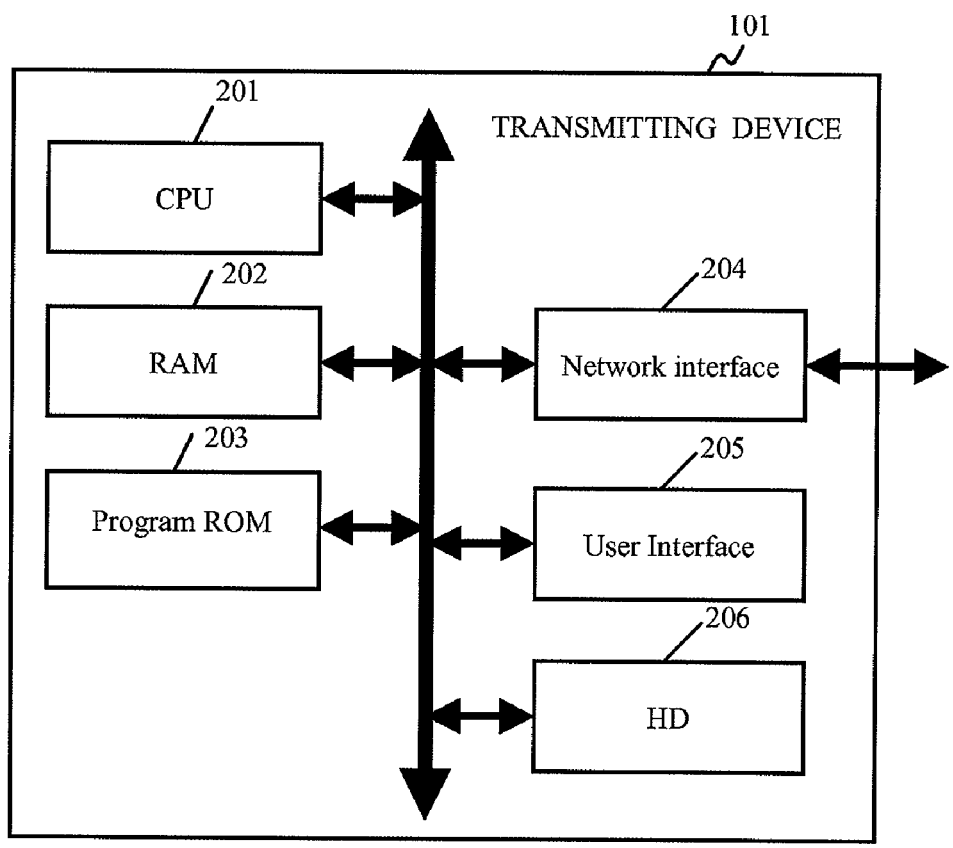
FIG. 2 illustrates a block diagram of a transmitting device adapted to incorporate the invention.

FIG. 2 illustrates a block diagram of a transmitting device 101 adapted to incorporate the invention.

Preferably, the transmitting device comprises a central processing unit (CPU) 201 capable of executing instructions from program ROM 203 on powering up of the transmitting device, and instructions relating to a software application from main memory 202 after the powering up. The main memory 202 is for example of Random Access Memory (RAM) type which functions as a working area of CPU 201, and the memory capacity thereof can be expanded by an optional RAM connected to an expansion port (not illustrated). Instructions relating to the software application may be loaded to the main memory 202 from the hard-disc (HD) 206 or the program ROM 203 for example. Such software application, when executed by the CPU 201, causes the steps of the flowcharts shown in FIG. 3 or 4 to be performed.

Reference numeral 204 is a network interface that allows the connection of the transmitting device to the communication network. The software application when executed by the CPU is adapted to react to client requests received through the network interface and to provide data streams via the network to the client.

Reference numeral 205 represents a user interface to display information to, and/or receive inputs from, a user.

Figure 3:
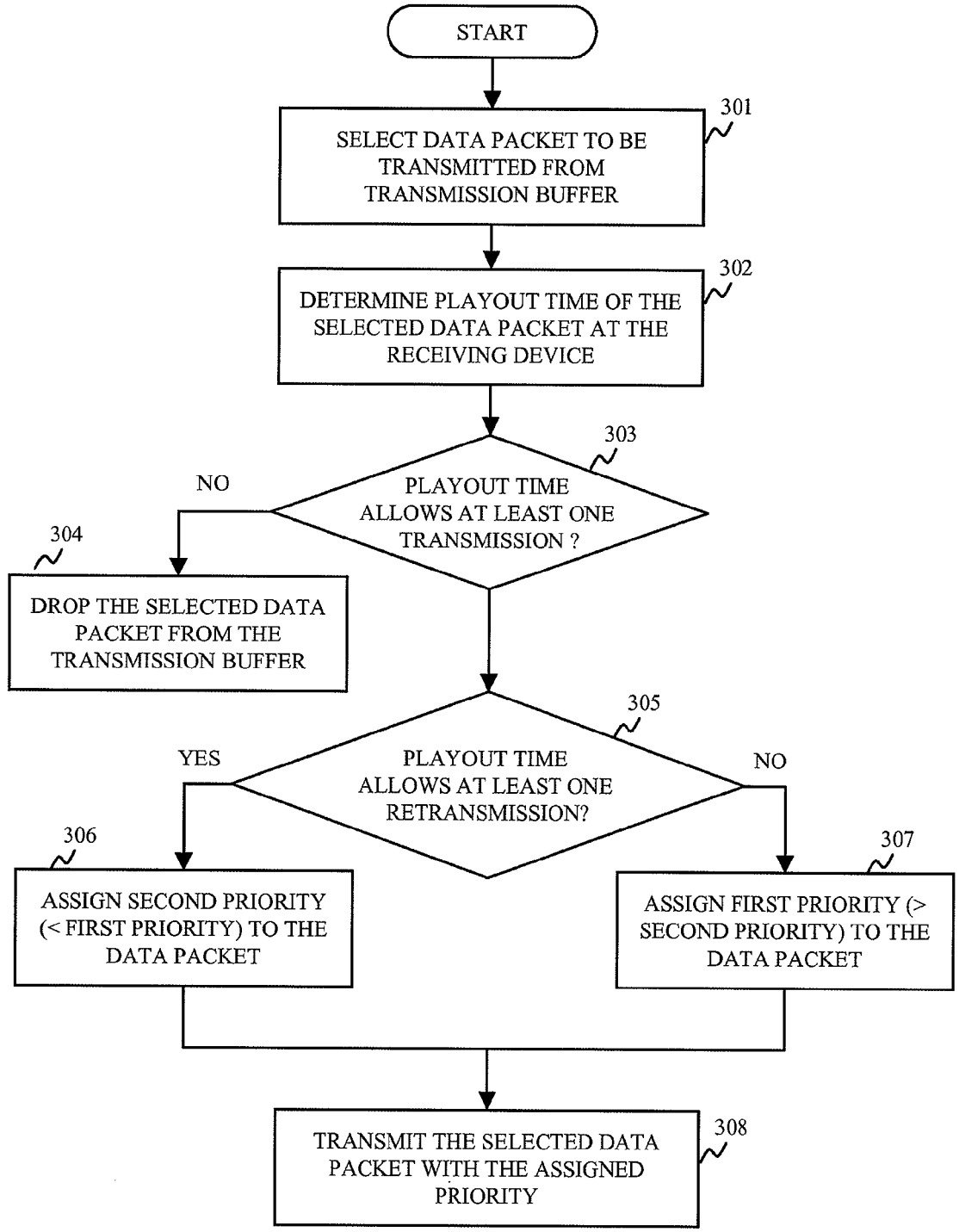
FIG. 3 is a flowchart illustrating a transmitting method of data packets according to a first embodiment the present invention as to be implemented at the sending device.

FIG. 3 depicts a flowchart for transmitting data packets according to a first embodiment of the present invention as to be implemented by the transmitting device 101. In this first embodiment, the communication network manages first and second priority levels.

Typically, the transmitting device implements a transmission buffer for storing data packets obtained from the packetization of the data stream prior to their transmission to the client 102.

A packet is selected from the transmission buffer at step 301, and the playout time of such packet at the receiving device is determined at step 302.

The playout time is the time at which the receiving device should present that data packet to an application for the rendering of the data stream. The rendering of the data stream, as for example the decoding and display of a video stream, is a real time process, and thus if a data packet is not available at its playout time it becomes obsolete and is discarded when received. The point in time at which a data packet shall be presented to the rendering application depends on the content of the data packet and the type of coding used (slice or frame based for example in the case of video streams).

More precisely, the playout time corresponds to the time at which a data packet is read by the rendering application from the reception buffer at the client 102.

The playout time may be estimated based on feedback information from the client. The client may provide a buffer filling level corresponding to the difference between the scheduled playout time of the next data packet to be transferred from the reception buffer to the rendering application and the playout time of the last data packet contained in the reception buffer prior to the transmission of the feedback information to the server containing that filling level. The buffer filling level represents thus the time necessary to present all the content of the reception buffer to the rendering application. An estimation of the playout delay is then obtained by adding to the received buffer filling level the transmission delay from server to client.

The implementation of the feedback information transfer can either be proprietary or follow some standards. For example, in the "DLNA Networked Device Interoperability Guidelines", dated March 2006, specifying the transport of data streaming over HTTP or RTP (Real-time Transport Protocol), there is provided Buffer Fullness Reports (BFR) transmitted by a receiving device. One BFR contains, among other things, the sequence number of the next data packet contained in the reception buffer to be presented to the rendering application at the client and the playout delay, calculated just before the sending of the BFR.

When the server obtains the playout delay from the client it can estimate the playout time of the selected packet by adding the playout delay to the scheduled time for transmitting the selected data packet. It should be noted that by default, the selected data packet is scheduled for transmission at a point in time in accordance with the Earliest Deadline First (EDF) algorithm, but other options exist. For example, the selected data packet may be scheduled at a point in time earlier than the default point in time as it is detailed in a second embodiment of the present invention.

Alternatively, the server may use time-stamps to determine the playout time of the selected data packet. A time-stamp is generally associated to every video frame of a video stream and corresponds to the relative playout time of video frames. The client needs to provide in the feedback information to the server the time-stamp of the next frame to be presented to the rendering application. The difference between that time-stamp and the time-stamp of the video frame transported in the selected data packet corresponds in this case to the playout delay. The playout time of the selected data packet is then obtained by adding the playout delay to the scheduled time for transmitting the selected data packet.

It should be noted that when one frame is transported in several data packets, all these data packets share the same time-stamp since they need to be rendered together by the rendering application for the decoding of the transported frame.

A test is performed at step 303 to check if, based on the determined playout time of the selected data packet by either one of the two determination methods, there is still enough time for the data packet to be transmitted and presented to the rendering application at the client.

If there is not enough time, the selected data packet is dropped (step 304) in order to save network bandwidth and the method continues with a new selected data packet from the transmission buffer at step 301.

At step 305 of the flowchart of FIG. 3 a test is performed to check if the playout time of the data packet selected at step 301 allows at least one retransmission. It is known to persons skilled in the art that a retransmission can be triggered explicitly after the reception of a negative acknowledgment informing about the failure of the initial transmission, or implicitly by the absence of a positive acknowledgment.

In an unfavourable case, a retransmission is triggered after the expiry of a timer having a predetermined duration $\Delta T1$. In a favourable case, a retransmission is triggered after a duration $\Delta T2 < \Delta T1$ when a negative acknowledgment is detected. The test at step 305 may take into account one of the above two cases or any intermediate case. Maximum confidence about the possibility of performing a retransmission is obtained if the unfavourable case is considered.

Let $T_{RET}$ be the time necessary to perform one retransmission. The test 305 is positive if:

playout time $\geq$ scheduled time for transmitting the selected data packet+$T_{RET}$;

wherein $T_{RET} = \Delta T + RTT/2$, RTT being the round-trip time, RTT/2 the transmission delay from server to client, and $\Delta T1 \geq \Delta T \geq \Delta T2$. The round-trip time may be for example computed based on feedback information provided by RTCP (Real-time Transport Control Protocol).

It should be noted that the present invention is not restricted at step 305 to test whether the playout time of the selected data packet allows at least one retransmission, but can be extended to any embodiment that tests whether the playout time of the selected data packet allows a recovery of the selected data packet in general.

For example, forward error correction means may be used to generate redundancy packets that are used by the receiving device to recover one or more lost data packets. If the redundancy packets can be generated, transmitted and received by the receiving device in time to recover the selected data packet, then the test 305 is positive otherwise it is negative. Explicit or implicit acknowledgments may be used to inform the server that redundancy packets need to be transmitted (such type of protocol is known as Hybrid Automatic Repeat reQuest/Forward Error Correction). Alternatively, redundancy packets may be transmitted without consideration of a feedback from the receiving device (the protocol is then a pure FEC). For example, a data packet and an associated redundancy packet may be transmitted systematically with a given priority level.

If the above test (305) is positive, a second priority level is assigned to the selected data packet (step 306), otherwise a first priority level, higher than the second priority level, is assigned to the selected data packet (step 307). The selected data packet is finally transmitted to the client at the schedule transmission time (step 308).

In other words, if there is enough time to perform at least one retransmission, a lower priority is given to the data packet at the first transmission because there is still an opportunity to retransmit the data packet if it is dropped by the interconnection nodes. On the other hand, if there is not enough time to perform at least one retransmission, a higher priority is given to the data packet to increase the chance for the data packet to reach successfully the receiving device even in case of network congestion.

Figure 4:
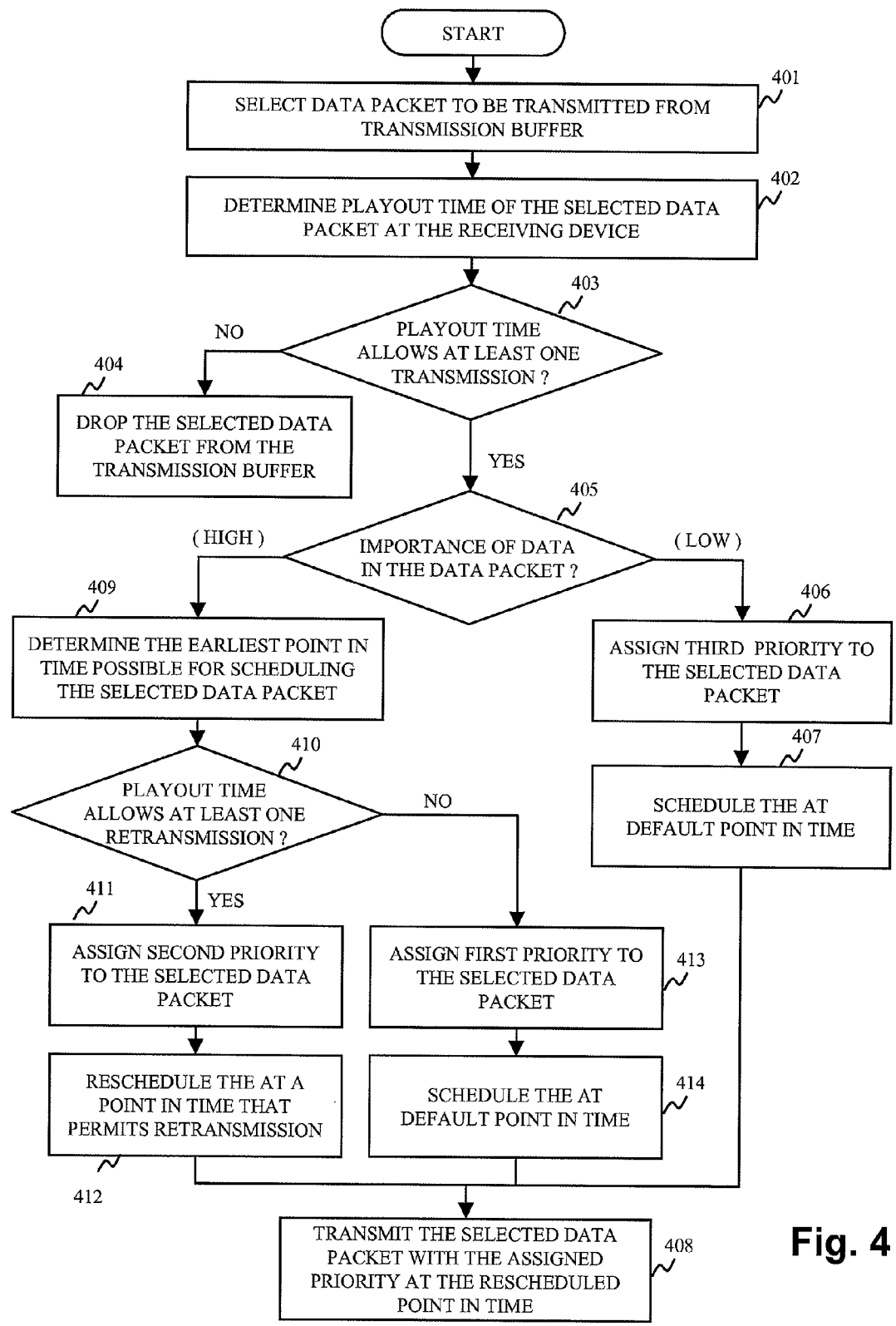
FIG. 4 is a flowchart illustrating a transmitting method of data packets according to a second embodiment the present invention as to be implemented at the sending device.

FIG. 4 depicts a flowchart for transmitting data packets according to a second embodiment of the present invention. In this second embodiment, the communication network manages at least three levels of priorities. These priorities are named first, second and third priority levels wherein: first level>third level>second level.

The steps 401, 402, 403 and 404 are similar to the steps 301, 302, 303 and 304 of FIG. 3, so they are not further described.

At step 405 a test is performed to determine the level of importance of data contained in the data packet. If data is of low importance, the third priority level is assigned to the selected data packet (step 406). The data packet is then scheduled for transmission at a default point in time taking into account the data packets already present in the transmission buffer (step 407).

As described above the importance of data depends on the content of the data packet. The CPU 201 reads the header of the data packet to determine the type of its content. For example, in case of an MPEG video stream, the CPU 201 determines if the content is part or all of a key frame (I) or a predictive frame (P or B), wherein a key frame represents data of high importance and predictive frame represents data of low importance. If the data packet contains both part or all of a key frame and predictive frames, the data contained in the data packet is considered to be of high importance.

By default, data packets are stored in the transmission buffer in the order they are generated after the packetization of the encoder output data, and are transmitted in the same order to the client on a First-In-First-Out basis (and following at the same time the Earliest Deadline First algorithm).

If the test 405 determines that the data is of high importance, the default order of scheduling the transmission of the selected data packet may be changed. Changing the default order is optional, but if implemented it can increase the playout delay and thus make the possibility of undertaking a retransmission more likely.

Step 409 determines the earliest point in time possible for scheduling the transmission of the selected data packet. This corresponds to how much a data packet can be transmitted prior to its default transmission time without precluding the decoder or the rendering application at the client from decoding or rendering the data stream correctly.

Considering the earliest point in time determined at step 409, a test is performed at step 410 to check if the playout time of the selected data packet allows at least one retransmission. If the step 409 is not implemented, the checking is performed considering the default scheduling time. The details for implementing this test are similar to those of step 305, except the point in time for scheduling the transmission of the selected data packet as explained above.

If the test is positive (at least one retransmission is possible), the second priority level is assigned to the selected data packet (step 411), and a point in time for scheduling the transmission of the data packet is set that allows the at least one retransmission (step 412). It should be noted that the set point in time does not correspond necessarily to the earliest point in time.

If the test is negative (no retransmission possible), the first priority level is assigned to the selected data packet (step 413) and the scheduling of the transmission of the data packet is set to a default point in time (step 414).

Finally, at step 408 the selected data packet is transmitted to the client at the point in time scheduled in one of the 407, 412 or 414 steps.

When congestion occurs in the network, a data packet with the second priority level (lower priority level) is first discarded. If it happens that this data packet contains important data, it means that it has been discarded by an intermediate node of the network to save either another data packet containing important data and which cannot be retransmitted or a data packet containing low importance data. In either case, the discarded data packet will be retransmitted with the first priority level (higher priority level), unless a further retransmission is possible.

Consequently, the present invention according to its second embodiment assigns priorities based on an aggregated data importance that takes into account not only the importance level of the data but also whether the corresponding data packet has a chance to be retransmitted or not if an initial transmission fails. High importance data that can be retransmitted possesses a lower aggregated importance during its initial transmission than low important data that cannot be retransmitted. This allows better management of the assignment of priorities and optimization of transmission performances (reduction of the number of data packets lost in the network).

The concept of generating different levels of aggregated data importance can be extended to adapt to any available number of priorities and to a plurality of data importance levels. Indeed, it's usual to have networks capable of managing more than three priorities, and one may want to distinguish between more than two levels of data importance.

According to a third embodiment of the present invention, the assignment of priority levels to data packets according to the embodiments of FIG. 3 or FIG. 4 is enhanced to take into account additional parameters like for example the balance between the amounts of low importance data and high importance data in the reception buffer of the receiving device, and/or the network bandwidth actually consumed for the transmission of the data stream relatively to allocated bandwidth.

In either situation, it may be useful to switch between a priority assignment method according to FIG. 3 or 4 and a default method where a higher priority level is assigned to data packets containing high importance data compared to a lower priority level assigned to data packets containing low importance data. The switching between the default method and the method of FIG. 3 or 4 may be performed repeatedly to satisfy predetermined network constraints representing the parameters given above for example.

For example, if the amount of high importance data in the reception buffer is lower than the amount of low importance data, it is preferable to assign to data packets containing that type of data (high importance) a higher priority level in order to increase their likelihood to reach the receiving device after one transmission, even if a retransmission would have been possible. It is important to keep the amount of high importance data at least equal to the amount of low importance data to ensure acceptable rendering quality by the rendering application. Of course, if the balance between low and high importance data in the reception buffer changes, priority level assignment strategy may be adapted accordingly.

The actual bandwidth used to transport the data stream may also be taken into account when deciding about the priority level assignment strategy to be adopted. When a plurality of data streams are transported through some common links in the communication network, they need to share the available bandwidth and the priority levels assigned to data packets belonging to different data streams need to be kept coherent to avoid flooding the network with only high priority traffic. The consistency of priority levels between different data streams can be maintained by adhering to the allocated bandwidth. Indeed, the retransmission of data packets containing high importance data and the assignment of high priority to data packets containing low importance data may lead to an actual bandwidth usage higher than the allocated bandwidth. A threshold may be set to switch between the default method and the method of FIG. 3 or 4 to keep the used bandwidth close, in average, to the allocated bandwidth.

Figure 5:
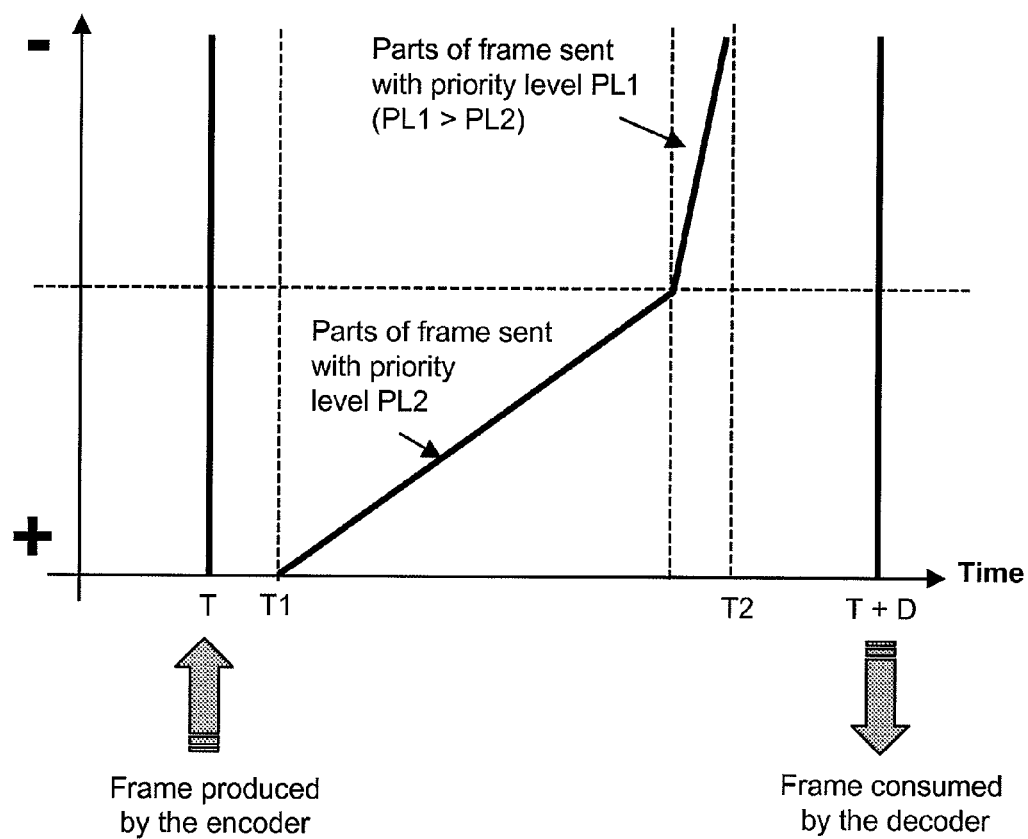
FIG. 5 shows graphically the basic principle of the present invention considering data importance and two levels of priority.

FIG. 5 shows graphically the basic principle of the present invention considering data importance and two levels of priority PL1 and PL2 where PL1>PL2. These two levels of priority may be for example the first and the second priority levels as described in the second embodiment of FIG. 4. For simplicity, the figure only represents the sending order of data packets containing parts of a same frame depending on their importance, but the principle can also apply when considering a plurality of frames/streams.

The Y-axis represents the relative importance degree of data inside a frame from most important data (bottom) to least important data (top). The X-axis represents the time.

The frame is produced by the encoder on the sender at time T and it is consumed by the decoder on the receiver at time T+D, wherein D is greater or equal than the playout delay of the frame. The playout delay and D are equal if the decoder is considered as the rendering application. The frame produced at time T is transmitted on the network between times T1 and T2 with T<T1<T2<(T+D). Data packets containing most important data are sent in advance compared to data packets containing less important data. If the playout time associated to the frame is enough to allow at least one transmission and one retransmission of a data packet then priority level PL2 is assigned to that data packet, otherwise priority level PL1 is assigned to that data packet. The basic principle is that the lower of the two priority levels is assigned to the data packet when there is enough time to perform a retransmission.

Figure 6:
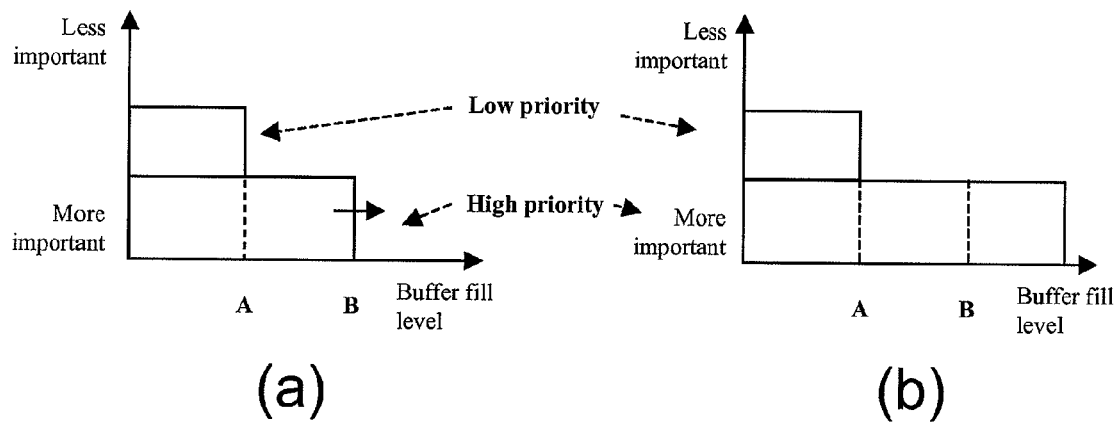
FIG. 6 depicts diagrams representing the evolution of the reception buffer's fill level when using prior art methods for assigning network priorities.
Figure 7:
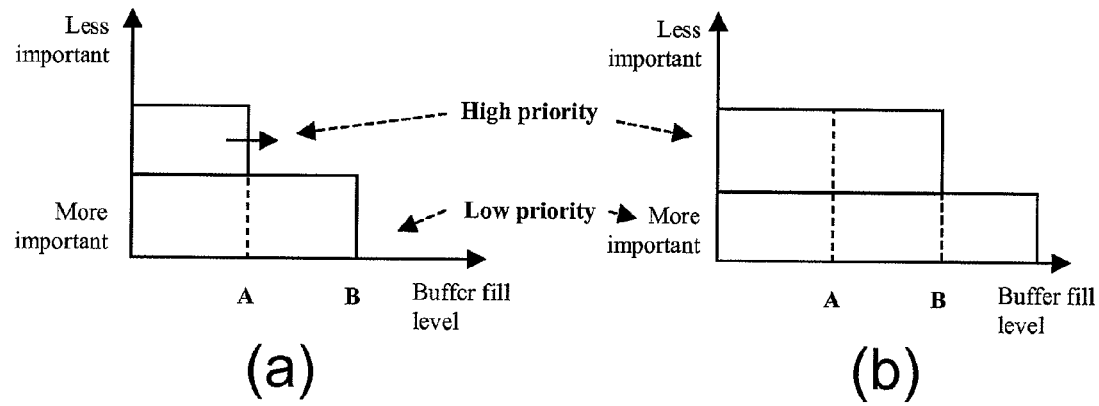
FIG. 7 depicts diagrams representing the evolution of the reception buffer's fill level according to the invention for summarizing the advantages of the present invention.

FIG. 7 depicts diagrams summarizing the advantages of the present invention compared to prior art methods depicted in FIG. 6.

The diagrams 6a, 6b, 7a and 7b roughly represent the evolution of the reception buffer's filling level with and without applying the invention in case of temporary network congestion. The diagrams highlight the advantages of the invention compared to prior art methods.

For each of these diagrams, the X-axis represents the evolution of buffer filling level and the Y-axis represents the importance degree of data from most important data (bottom) to least important data (top). For simplicity, only two degrees of importance are represented.

In prior art methods, most important data is sent with a high priority level while less important data is sent with a low priority level. With such a policy, in case of congestion, the network will drop less important data (due to their lower priority) before dropping more important data.

The two diagrams 6a and 6b roughly summarize the impact of such a policy on buffer levels in presence of congestion. It is assumed that most important data is sent in advance compared to the less important data for comparison reasons. The diagram 6a shows an example of buffer fill levels at the time of network congestion starting. The fill level of most important data (mark B) is greater than the fill level of less important data (mark A) because most important data are sent in advance. Then due to the congestion, less important data are dropped (the fill level stays at A) while more important data still continue to fill the buffer (fill level B increasing as indicated by the arrow to reach status depicted in FIG. 6b). In this way, the cited prior art allows maintaining longer playout duration in case of congestion but with a rapid decrease on video quality because of the shortage of less important data starting at mark A.

On the contrary, the two diagrams 7a and 7b summarize the behaviour according to the invention. In this case, more important data with low priority is sent before less important data. As with diagram 6a, the diagram 7a shows an example of buffer fill levels at the time of network congestion starting. Here the fill level of more important data (mark B) is also greater than the fill level of less important data (mark A). Indeed most important data is still sent in advance. But in case of congestion, most important data is first dropped by routers while less important data continue to fill reception buffer (fill level A increasing as indicated by the arrow to reach status depicted in FIG. 7b). Such a policy allows maintaining the highest quality for the video for a longer playout duration before loss of quality which corresponds to buffer fill level mark B instead of mark A (both more important and less important data are available for longer duration). If the congestion lasts for longer, and according to the third embodiment described above, the invention may revert to a situation where the high priority level is assigned to more important data (part beyond mark B in FIG. 7b).

The invention claimed is:

1. A method for transmitting over a data communication network data packets of a data stream to a receiving device, comprising:
   selecting a data packet from a buffer memory containing data packets to be transmitted;
   determining whether the play-out time of the selected data packet at the receiving device allows a recovery of said selected data packet;
   assigning a first priority level or a second priority level to the selected data packet based on the result of the determining; and
   transmitting the selected data packet with said assigned first or second priority level.

2. Method according to claim 1, wherein the higher of the first and second priority levels is assigned to the selected data packet if the result of the determining is negative, and the lower of the first and second priority levels is assigned if the result is positive.

3. Method according to claim 1, wherein the data stream contains data types of different importance, and wherein the priority level assigned is based on the type of data contained in the selected data packet in addition to the result of determining step.

4. Method according to claim 3, wherein when the content of said data packet contains high important data, the higher of the first and the second priority levels is assigned if the result of the determining is negative, and the lower of the first and the second priority levels is assigned if the result is positive.

5. Method according to claim 4, wherein when the content of said data packet contains low important data, a third priority level is assigned to the selected data packet wherein the third priority level is set to an intermediate value between the first and the second priority levels.

6. Method according to claim 3, further comprising determining the quantity of important data contained in a reception buffer of the receiving device, and wherein if the determined quantity is below a predetermined threshold the higher of the first and the second priority levels is assigned to the data packet if it contains high important data and the lower of the first and the second priority levels is assigned to the data packet if it contains low important data.

7. Method according to claim 1, further comprising determining the play-out time of the selected data packet.

8. Method according to claim 7, wherein determining the play-out time comprises a step of receiving from the receiving device a play-out delay representing the time necessary to present all data packets in a reception buffer of the receiving device to a rendering application.

9. Method according to claim 8, wherein the play-out time equals the sum of the play-out delay and a scheduled time for transmitting the selected data packet.

10. Method according to claim 7, wherein determining the play-out time comprises receiving from the receiving device a time stamp associated to the next data packet to be presented to a rendering application at the receiving device.

11. Method according to claim 1, wherein the recovery of the selected data packets consists of performing at least one retransmission of said data packet.

12. Method according to claim 11, wherein determining whether the play-out time of the selected data packet at the receiving device allows a recovery of said selected data packet comprises comparing the determined play-out time with the sum of a scheduled time for transmitting the selected data packet and the time necessary to perform at least one retransmission.

13. Method according to claim 1, wherein the recovery of the selected data packets consists of transmitting at least one redundancy packet generated from at least the selected data packet using a forward error correction scheme.

14. A non-transitory computer-readable storage medium storing a software application for transmitting over a data communication network data packets of a data stream to a receiving device, the software application comprising:
   computer executable instructions for selecting a data packet from a buffer memory containing data packets to be transmitted;
   computer executable instructions for determining whether the play-out time of the selected data packet at the receiving device allows a recovery of said selected data packet;
   computer executable instructions for assigning a first priority level or a second priority level to the selected data packet based on the result of the determining step; and
   computer executable instructions for transmitting the selected data packet with said assigned first or second priority level.

15. A transmitting device for transmitting over a data communication network data packets of a data stream to a receiving device comprising:
   a selection unit for selecting a data packet from a buffer memory containing data packets to be transmitted;
   a determination unit for determining whether the play-out time of the selected data packet at the receiving device allows a recovery of said selected data packet;
   an assignment unit for assigning a first priority level or a second priority level to the selected data packet based on the result of the determination unit; and
   a transmission unit for transmitting the selected data packet with said assigned first or second priority level.

16. A method for transmitting over a data communication network data packets of a data stream to a receiving device, comprising:
   selecting a data packet from a buffer memory containing data packets to be transmitted;
   determining whether the play-out time of the selected data packet at the receiving device allows a recovery of said selected data packet;
   assigning a first priority level or a second priority level to the selected data packet based on the result of the determining step; and
   transmitting the selected data packet with said assigned first or second priority level.

17. A transmitting device for transmitting over a data communication network data packets of a data stream to a receiving device comprising:
   a selection means for selecting a data packet from a buffer memory containing data packets to be transmitted;
   a determination means for determining whether the play-out time of the selected data packet at the receiving device allows a recovery of said selected data packet;
   an assignment means for assigning a first priority level or a second priority level to the selected data packet based on the result of the determination unit; and
   a transmission means for transmitting the selected data packet with said assigned first or second priority level.

* * * * *